INVENTOR
HANS U. SCHUERCH
BY HIS ATTORNEYS
HARRIS, KIECH, RUSSELL & KERN

Jan. 28, 1969  H. U. SCHUERCH  3,424,220
ISOTENSOID STRUCTURES AND METHOD
Filed Oct. 21, 1965  Sheet 4 of 7

INVENTOR
HANS U. SCHUERCH
BY HIS ATTORNEYS
HARRIS, KIECH, RUSSELL & KERN

# United States Patent Office 3,424,220
Patented Jan. 28, 1969

3,424,220
ISOTENSOID STRUCTURES AND METHOD
Hans U. Schuerch, Santa Barbara, Calif., assignor to Astro Research Corporation, Santa Barbara, Calif., a corporation of California
Filed Oct. 21, 1965, Ser. No. 499,567
U.S. Cl. 152—358    37 Claims
Int. Cl. B60a 9/10; D04b 9/08

ABSTRACT OF THE DISCLOSURE

An isotensoid structure in which high-strength load-carrying filamentary members are kept in place relative to each other by stitches of a knit matrix. The filamentary members are joined on at least one edge of the knit matrix by loop means through which a strong anchor member extends.

My invention relates to isotensoid structures for technical or industrial uses. More particularly, the invention relates to isotensoid structures of the type in which applied loads are carried predominantly or substantially exclusively by side-by-side filamentary members that are equally stressed under applied loads.

The filamentary members of such a structure must be retained in a side-by-side pattern with their spacial orientation precisely determined. At the same time it is often desirable that the filamentary members should be mounted in a way permitting limited movement toward and away from each other. The basic objective of the present invention is to arrange the filamentary members within a knitted matrix that functions largely to determine the positions or spacial geometry of side-by-side filamentary members that are linked in one way or another with the stitches of the knitted matrix.

The invention is particularly useful in the production of thin-walled high-strength isotensoid structures having precise dimensional tolerances in one direction within the wall, representing the direction of stress due to applied loading, while remaining extensible and flexible in another direction, this other direction being within the wall and normal to the direction of stress due to applied loading. In accordance with the invention the load-carrying filamentary members extend in the first-mentioned direction while the stitches of the knitted matrix provide the extensibility and flexibility in the other direction.

It is an important object of the present invention to provide a high-strength isotensoid structure having a shroud including, first, a fabric element or component and, second, a high-strength filamentary component comprising a plurality of high-strength filamentary members that are uniquely anchored to each other and to one or more anchor members, the spacial relation of the filamentary members being determined by entwinement or linkage with portions of the fabric component. The fabric element or component preferably comprises a knitted matrix or confining element with one or more load-carrying filamentary members linked with the stitches of a knit row or wale, the filamentary members being anchored at their ends or being suitably attached to filamentary members of other rows as by being sections of the same filamentary element, as will be explained. In referring to knit rows I have reference either to rows extending perpendicular to the direction of knitting, as will be illustrated in most embodiments by way of example, or rows in the direction of knitting, sometimes termed as wales.

The knitted matrix in such a structure maintains the desired spacing of the filamentary members and unifies the elements of the shroud. Its compliance in a direction at right angles to the filamentary members or the stress due to applied load permits the design of foldable isotensoid structures. The shroud can be used alone as an isotensoid structure or it can be coated or faced with a compliant material or embedded therein to form the isotensoid structure.

The knitted matrix is made up of at least one continuous flexible filament formed into progressive rows of knitted stitches with the stitches of each row being interlocked with those of adjacent rows. The stitches of any given row traverse a space between the rows respectively preceding and succeeding such row. It is an object of the invention to extend a filamentary member along such a space and to link it with the stitches traversing such space.

The knitted matrix may be knitted in any known pattern but each stitch of each row will comprise a loop of the flexible filament extending across a corresponding space to be linked with a loop in another row or a loop of the same row if considered in the wale direction. It is within the scope of the invention to link the filamentary members with such loops in any one of a number of ways. For example, the loops of a given row may extend alternately in front of and behind a corresponding load-carrying filamentary member or such filamentary member can extend through some or all of the loops of the corresponding row. Various other linking patterns can be used, including combinations of those mentioned.

Those portions of the filamentary members extending through such spaces are preferably substantially geodesic, both in the sense of topology and in the sense of not undulating to any substantial degree betweeen the end portions thereof in any definite pattern, e.g., in any pattern determined by the stitches with which they are linked. In some of the structures to be described such portions are substantially straight, as distinct from substantially undulating in any definite pattern such as a pattern determined by the stitches. If the isotensoid structure is flat the substantially geodesic filamentary members are thus substantially straight and can lie essentially in the same plane. If the isotensoid structure is curved only in the direction of knitting the substantially geodesic filamentary members can lie side by side essentially in what may be described as a curved plane. If the shroud describes a generally curved surface the substantially geodesic filamentary members will usually extend along geodesic lines, i.e. each will extend along a line of minimum distance across the curved surface.

The filamentary members are desirably formed of a high-strength filamentary material that is preferably bendable transversely and somewhat elastic in a longitudinal direction. In high-strength internal-pressure vessels the filamentary members should have a high tensile strength to resist tensile loads induced by internal pressures on the vessel greater than the pressure exterior thereof. With pressure vessels designed to resist higher pressure exterior thereof than interior thereof and with other high-strength structures designed to resist compressive loads, the filamentary members should have a high compressive strength. In all instances however the stitches of the knitted matrix determine the maximum spacing of the side-by-side filamentary members and prevent localized spreading thereof, maintaining these filamentary members in a side-by-side relation in which all such members are equally loaded.

In the preferred practice of the invention the filamentary members are sections of a long continuous filamentary element. If the composite matrix is tubular, the filamentary element will commonly be helical. If the isotensoid structure is to have in effect two opposed end portions at the ends of knitted rows, the filamentary members are in effect formed by serpentine loops of the filamentary element. The latter represents an important embodiment of the invention.

The filamentary element can be serpentined to and fro across the knitted matrix through the aforesaid spaces as knitting progresses or after it is completed. The filamentary element can be shaped to provide end loops extending from one or both end portions of the isotensoid structure along a corresponding edge thereof. These end loops form a selvage supplementing the normal selvage of the knitted matrix at the ends of the knitted rows. It is an important object of the invention to place a long continuous filamentary element in a knitted matrix in serpentine form with the sections or filamentary members joined by end loops at one or both edges or end portions of the isotensoid structure.

Importantly, an anchor member such as a rod, filament, draw-string, etc. can be threaded through the end loops to anchor the corresponding end portion of the isotensoid structure or the end loops protruding therefrom. This is a most desirable feature when attaching an isotensoid structure to a flange of a closure, access element or mounting element; also when employing the invention in the construction of pneumatic tires, as will be described. It is one important object of the invention to extend an anchor member through such end loops in such manner that it not only determines the positions of the ends of the filamentary members but receives the tensile stresses of all of the filamentary members. A further important object is to dispose an anchor member through the end loops of a long continuous filamentary element that serpentines through the knitted matrix with sections of the filamentary element forming the aforesaid filamentary members. Such a construction is of particular significance in the manufacture of those structures that are formed of generally toroidal shape or of a shape in which the filamentary members bow outwardly and/or inwardly between ring-like anchor members of the same or different diameter. It is an object of the invention to employ two such anchor members respectively extending through the end loops of a serpentine element that are disposed at opposed extremities of the isotensoid structure. The filamentary members, formed by sections of the serpentine filamentary element, can then extend meridonally or at corresponding very small angles to meridonal planes, being in each such instance substantially meridonal filamentary members both in the sense of direction and lack of undulation with the stitches of the knitted matrix.

As a specific important example, such a construction is most desirable in the manufacture of radial-cord pneumatic tires in which an attempt is made to anchor individual meridonal or substantially meridonal cords to two tire beads of equal diameter, the anchoring being usually by adhesion to the beads. Anchoring difficulties are completely eliminated by using a long filamentary element or cord and looping same back and forth across the tire contour with end loops extending around the spaced beads so that the tire carcass ends up with each tire bead extending through all of a corresponding group of end loops in anchoring relation. It is an object of the invention to provide a pneumatic tire or tire carcass constructed in such fashion. Another object is to construct a tire carcass with adjoining substantially meridonal cords made up of successive sections of the same cord or filamentary element and with end loops joining such successive sections encircling a tire bead.

Generally stated, objectives of the invention include the provision of (1) an isotensoid structure which has uniform stress in all its load-carrying filaments, which filaments remain substantially geodesic or straight during incorporation into a knitted matrix or at least when loaded; (2) an isotensoid structure utilizing a continuous load-carrying filamentary element that provides uninterrupted strength without resort to secondary joints or seams and in which structure the load-carrying filamentary member is connected to points of attachment at precisely dimensioned distances; (3) an isotensoid structure that can be shaped during the weaving process and that thus provides an integral structure without the need of tailoring by seams; (4) an isotensoid structure that can stretch or compress in directions transverse to the load-carrying filaments without danger of tearing or wrinkling; and (5) an isotensoid structure that can be formed in various desired shapes in which the load-carrying filaments extend in side-by-side relation as determined by stitches with which they are woven.

Further objects and advantages of the invention will be evident to those skilled in the art from the following description of exemplary embodiments and from the attached drawings in which:

FIG. 12 illustrates the invention as applied to a multi-toroidal-element isotensoid structure of generally tubular form, FIG. 12a being an enlarged detail and FIG. 12b showing an alternative lacing when viewed in the direction of arrows 12b—12b of FIG. 12a;

FIG. 16 is a fragmentary sectional view of a pneumatic tire incorporating the invention while FIG. 17 is a cross-sectional view of the carcass thereof;

FIGS. 18 and 19 show alternative cord arrangements for a pneumatic tire;

Figures 1, 2, 3, 4, 4A, 5, 6:
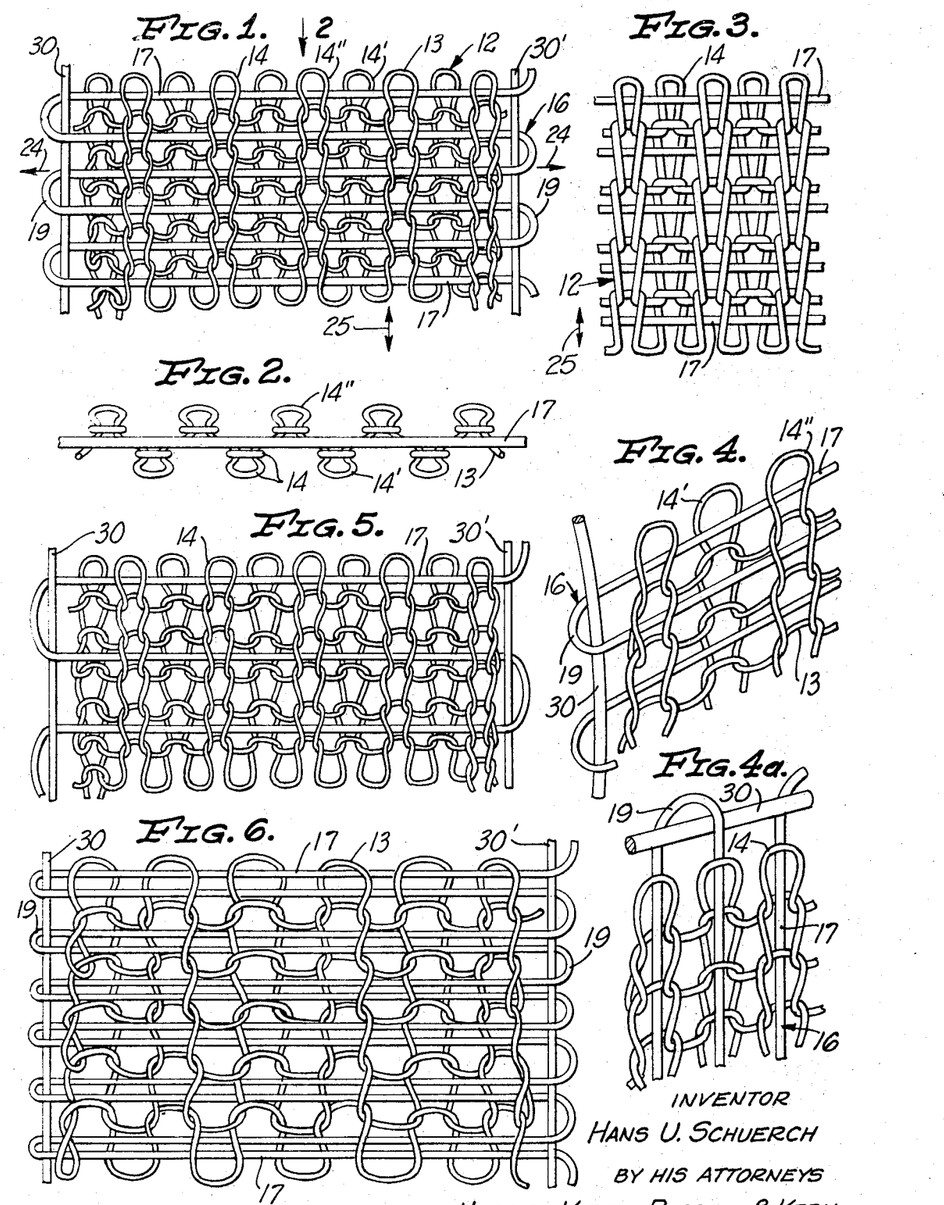
FIG. 1 illustrates a portion of an isotensoid structure in which the filamentary members are sections of a continuous serpentine filamentary element and are linked with knit stitches of a row in a first pattern.
FIG. 2 is a fragmentary view taken in the direction of the arrow 2 of FIG. 1, being distorted in a vertical direction to exemplify better the linking pattern.
FIG. 3 is a fragmentary view similar to FIG. 1 showing the position of the stitches when taut.
FIG. 4 is an enlarged fragmentary view of the structure of FIG. 1 showing the pattern and end loops near one side or end portion of the structure of FIG. 1 when associated with an anchor member that is curved in the direction of knitting.
FIG. 4a is an enlarged fragmentary view of a structure in which the filamentary members extend in the wale direction.
FIGS. 5–8 illustrate alternate patterns for the stitches and filamentary members in conventional rows.

In FIGS. 1 and 2 are illustrated an isotensoid structure or shroud thereof including, first, a knitted matrix 12 formed of a flexible filament 13 looped into a pattern of stitches 14, and, second, a long filamentary element 16 composed of (a) substantially geodesic and substantially nonundulating body sections or filamentary members 17 and (b) end sections forming end loops 19. The filamentary element 16 is serpentined back and forth as knitting of the flexible element 13 continues. The stitches 14 of the various rows are interlocked with stitches of preceding and succeeding rows. Stated otherwise, the stitches of any given row traverse a space between the rows respectively preceding and succeeding such row. Each filamentary member 17 extends along such a space and is suitably linked with some or all of the stitches traversing such space.

Various knitting and linking patterns can be employed. FIGS. 1-4 illustrate a knit-purl pattern forming oppositely displaced stitches 14' and 14" of a given row extending alternately in front of and behind the corresponding filamentary member. Alternatively the filamentary member may extend through some or all of the stitch loops of the corresponding row, as suggested in FIG. 6, or combinations of these linkage patterns can be employed along each row or in succeeding rows. FIG. 4a shows one of several linkage patterns that can be used if the filamentary members 17 extend in the wale direction, as can be done in any of the embodiments to be described.

While the filamentary members 17 can be separate elements suitably joined together at their ends, it is desirable to employ a single long filamentary element 16 serpentined across the knitted matrix 12 with body sections thereof forming the filamentary members 17 and end sections thereof forming the end loops 19 which join together the filamentary members. The filamentary members 17 should be substantially geodesic and should extend in the direction of stress due to the applied load, indicated by the opposed arrows 24 of FIG. 1, the applied load being equally distributed therebetween. The stitches of the knitted matrix 12 serve primarily to maintain the filamentary members 17 in proper spacial orientation while permitting the structure to expand in limited degree in a direction in the plane of the structure but perpendicular to the direction of stresss due to loading, the latter direction being indicated by the double-headed arrow 25. FIG. 3 illustrates the maximum expansion of the structure of FIG. 1 in the direction of the arrow 25 when the stitches become taut due to application of a load in this direction. The taut stitches still determine the spacing pattern of the filamentary members 17 and maximize the possible spacing between any two adjacent filamentary members.

The end loops 19 serve many functions. They form a selvage supplementing the selvage formed by the end stitches of the knitted matrix 12. Importantly, the end loops form a means whereby isotensoid structures can be connected together or whereby an end portion of an isotensoid structure can be connected to some other structure. Of particular significance is the fact that an anchor member 30 can be threaded through the end loops protruding from one or both edges or ends of the knitted matrix FIG. 1 shows anchor members 30 and 30' respectively at the opposite edges of the knitted matrix permitting anchoring thereof to different structures or to another edge of the same structure. If there are two anchor members respectively at the opposed edges, the main body of the knitted matrix 12 will span the space therebetween and the anchor members can attach the edges to suitable structures. If the end loops at the opposed edges are linked with the same anchor member 30 a tubular structure will result, as compared with the essentially planar structure suggested in FIG. 1.

Figure 11:
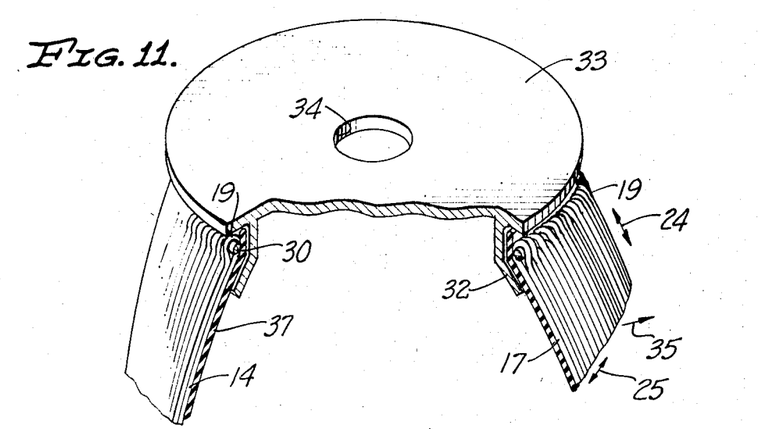
FIG. 11 illustrates a typical attachment of an isotensoid structure to a flanged mounting element in accordance with the invention.

Each anchor member 30 may be a rod, filament, drawstring, etc. and will take the tension loads applied to the filamentary members 17, serving also to maintain these tension loads equal in the various filamentary members if the lengths of these members are precisely determined as the shroud is being formed. FIG. 11 illustrates the utility of an anchor member 30 of the circular or draw-string type in connecting an isotensoid structure to a flange 32 of an element 33 that may serve as a closure element, an access element or a mounting element. In FIG. 11 the flanged element 33 is shown as having an opening 34, closable if desired by any suitable means, the opening providing access to the interior of a vessel-type isotensoid structure formed in accordance with the invention. The ring-like anchor member 30 extends through all of the end loops 19 and is tensioned around the circular flange 32 inwardly of a flared extremity thereof. If the opposite end of the isotensoid structure is closed, as by means similar to that shown in FIG. 11, it may constitute a pressure vessel.

Internal pressure in such a vessel will induce a radial pressure, indicated by the arrow 35, which will be resisted by equal tensions in the filamentary members 17 in the direction of the arrows 24. Separation of the filamentary members 17 in the direction of the arrow 25 will be limited by the stitches 14, shown only diagrammatically in FIG. 11. Internal pressures in such a container will also induce a tension stress in the anchor member 30 but this member will be sufficiently large and strong to hold the connected components together. They could separate only if the anchor member 30 expanded to the diameter of the flared extremity of the flange 32.

In such a pressure vessel, as in many other uses of the invention, the interstices of the shroud may be filled or traversed by a suitable closure means that may be a coating or covering adjacent or adhered to one or both faces of the shroud elements or a substance encapsulating these shroud elements. FIG. 11 illustrates an impervious sheath 37 inside the shroud and present either as a coating of compliant material applied to the inner surface of the shroud or present as a separate element clamped against the flange 32 by the anchor member 30. Whatever material is used to render the composite shroud impervious and in whatever shape this material appears, it should desirably be a compliant material permitting limited expansion of the structure in the direction of the arrow 25.

It will be apparent that the anchor member 30 may be a straight member, if the isotensoid structure is essentially in a flat plane as in FIG. 1, or a curved member if the edge or end portion of the isotensoid structure is to lie in a curved pattern as in FIGS. 4 and 11.

The anchor member will ordinarily be the filamentary member of greatest size and strength in the composite system. It may be formed of steel or other high strength material.

Next in strength will usually be the serpentined filamentary element 16. The material thereof is preferably of high strength but such that the filamentary element is bendable transversely and somewhat elastic in a longitudinal direction. The filamentary element can be made of metal, glass, plastic, etc. and may be of the stranded or monofilament type. Particularly desirable structures may be made employing as the filamentary element long-chain or cross-linked synthetic plastics such as nylon, Dacron, etc. but metal wires of steel, aluminum, etc. can often be used to advantage.

The flexible filament 13 forming the knitted matrix may be smaller in size and strength than the filamentary element 16 forming the filamentary members 17. Any load in the direction of the arrow 25 is divided between a large number of stitch-forming segments of this flexible filament 13 and the strength thereof in tension can be much less than the filamentary member 16. The flexible element 13 forming the knit stitches may be any suitable yarn or cord material. It may be made of one of the aforesaid synthetic plastics in monofilament or stranded form or may be made of natural textile fibers. It should be of such flexibility as to be handled by a knitting machine. Existing knitting machines can be modified to dispose the filamentary element 16 sinuously in the desired rows of knitted stitches as knitting progresses.

It is not essential to the invention that a filamentary member 17 be entwined with the stitches of every knitted row. A filamentary member may be placed only in every second row (FIG. 5), every third row, etc. Also it is possible to place a pair of filamentary members in each row or selected rows with an end loop 19 joining the filamentary members of the pair at one edge of the knitted matrix, see FIG. 6. As aforesaid, the one or more filamentary members in a row can be linked with the stitches by extending therethrough. FIG. 6 illustrates this in a paired-member pattern. Linkage in this way may involve the filamentary member or paired filamentary members entering the stitches alternately from the front and back of the knitted matrix, as shown, or the member may enter all of the linked stitches in the same direction.

Figure 9:
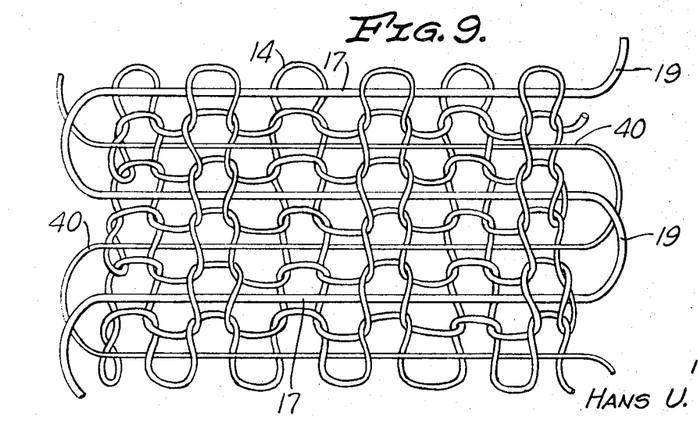
FIG. 9 illustrates an alternative embodiment including a supplementary run-stop filament.
Figure 10:
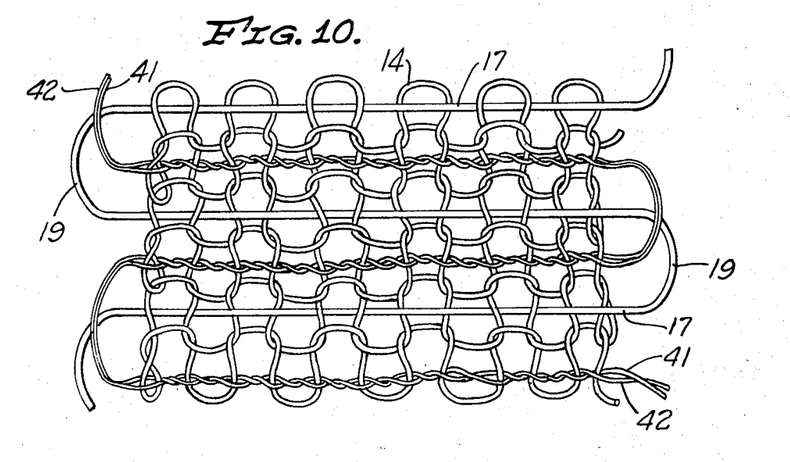
FIG. 10 illustrates the invention with an intertwined run-stop filament.

Linkages of any of these types provides an effective run-stop in the knitted matrix so that any accidental break in the knitted filament 13 cannot propagate along the length of the knitted matrix. Supplementary thereto, a separate run-stop may be employed, constituting in FIG. 9 a filament 40 threaded through the stitches of alternate rows or an intertwined run-stop filament as in FIG. 10 in which filaments 41 and 42 are intertwined by twisting together or crossing one or more times within the stitches of a row and/or in the space between such stitches. In either arrangement the run-stop filaments can traverse the knitted matrix in each knitted row or in rows more widely separated than in the embodiments of FIGS. 9 and 10.

Figure 7:
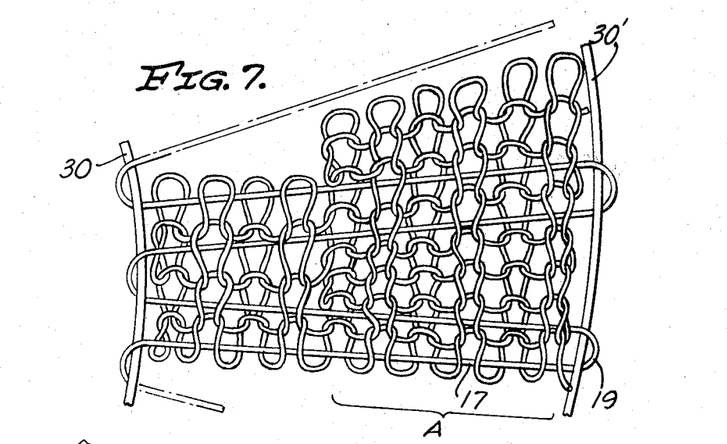
Figure 8:
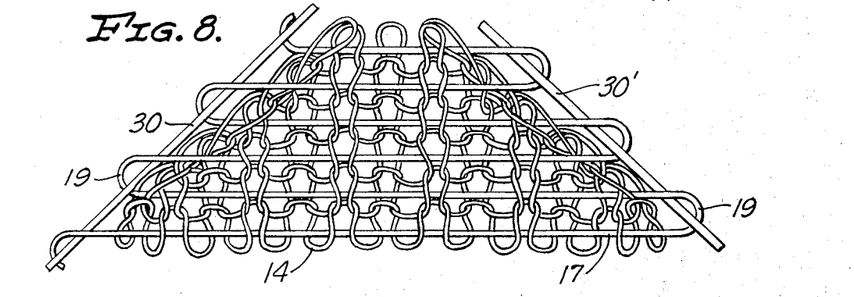

If the knitted matrix spans the space between two anchor members respectively linked with the end loops 19 at its sides the length of each filamentary member 17 should be precisely determined. This is true whether the anchor members 30, 30' extend in parallel relation at the edges of the knitted matrix (FIG. 1), whether such anchor members converge or diverge (FIG. 8) or whether such anchor members are curved or associated with a knitted matrix of greater length near one edge than the other (FIG. 7). FIGS. 7 and 8 also show ways in which the knitted matrix can be shaped into diverse patterns. In FIG. 7 at least some of the filamentary members 17 diverge rightwardly toward the edge of greatest length, being properly spaced by a knitting pattern in which two or more short rows of knitted stitches are knit in an outer zone A along with knit rows extending from edge to edge of the knitted matrix. Isotensoid structures of concave, convex or saddle shape can be made by adding short rows appropriately at both ends or in the center of the knitted matrix. The same effects can be obtained by adding stitches if the filamentary members are linked with the wale stitches as in FIG. 4a.

If the anchor members 30, 30' of FIG. 7 are rings of different diameter lying in the same flat plane a ring-like isotensoid structure will be formed. On the other hand if the two anchor members 30 and 30' are rings of different diameter lying in parallel or different planes a conical or frusto-conical structure can result. If the filamentary members 17 in the latter construction are not straight but bow inwardly of the structure a tent-like isotensoid structure can be formed, shaped as a concave surface of revolution e.g. a hyperboloid or an antisphere. Likewise if the filamentary members bow outwardly of the structure at positions between two ring-shaped anchor members of different diameter a bulbous isotensoid structure will result approaching a toroidal shape or the shape of a pneumatic tire with its two beads formed by anchor members of different diameter. If the filamentary members bow outwardly between two ring-shaped anchor members of the same diameter the resulting bulbous structure may take the form of a Japanese lantern or truncated watermelon, see FIGS. 14 and 15 for example. Stated in other words the isotensoid structure may be in the shape of an oblate or prolate spheroid. If the polar openings of the latter are suitably closed a deformable pressure vessel will result that will change its shape toward an oblate spheroid with increase in internal pressure and that can be used as transducer to convert fluid pressure into a directional mechanical force, as will be later described with reference to FIGS. 14 and 15.

Isotensoid structures of tapered shape or with tapered sections can be formed in accordance with the showing of FIG. 8. Here the filamentary members 17 progressively decrease or increase in length in accordance with the desired pattern. The number of stitches in corresponding rows is progressively decreased or increased in some relation to the length of the linking filamentary members.

Figure 13:
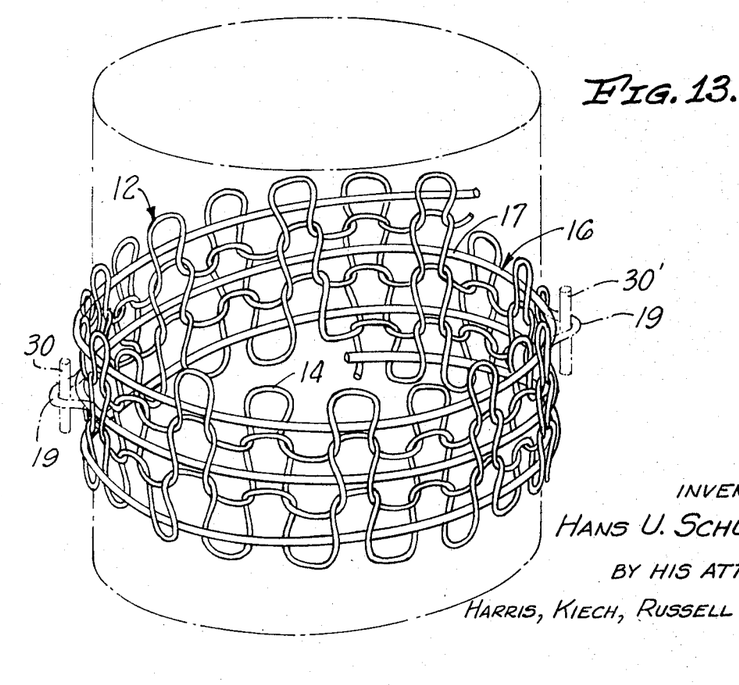
FIG. 13 illustrates the invention as applied to a tubular isotensoid structure employing a helical filamentary element.

One manner of forming a tubular isotensoid structure is illustrated in FIG. 13. Here a long filamentary element 16 extends helically through a circularly-knitted matrix 12 with each turn of the filamentary element 16 constituting one of the filamentary members 17. Such filamentary members are connected together by being integral sections of the filamentary element 16. No end loops are present in such construction but they can be employed therein if desired. In the latter instance each turn or selected turns can have one or more outwardly looping portions, shown in dotted lines in FIG. 13, constituting end loops 19, and these can be linked with an anchor member 30, 30' functioning as aforesaid, particularly if the structure is flattened to some degree or completely.

Figures 12, 12A, 12B:
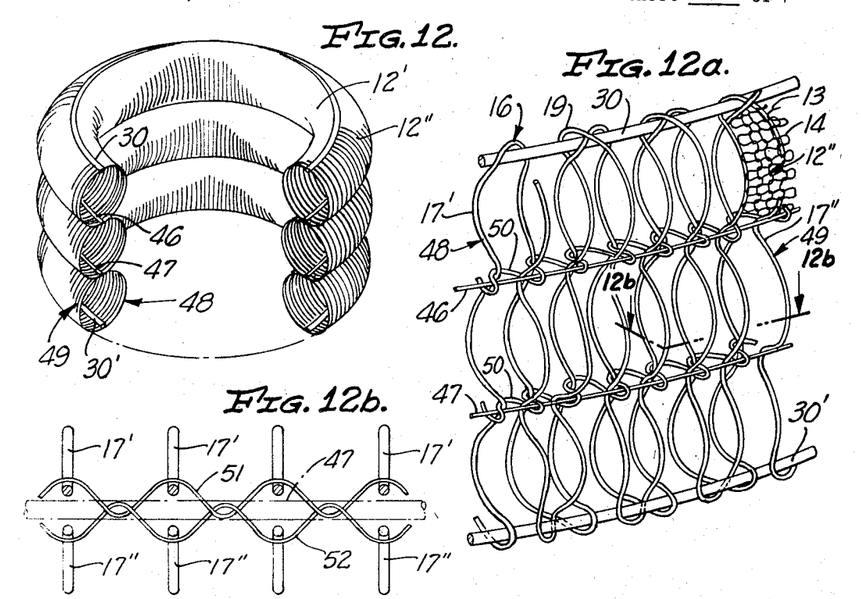

FIG. 12 illustrates the invention as applied to a torus-stack or multiple-toroid structure useful in many applications. The primary anchor members 30 and 30' are rings of the same or different diameter. Two auxiliary anchor members 46 and 47 are shown therebetween, also of ring form. As before, a single filamentary element 16 serpentines back and forth between the anchor members 30 and 30' but here provides filamentary members 17' that will then or ultimately form an inner shroud portion 48 and other filamentary members 17'' that will similarly form an outer shroud portion 49, the members 17' and 17'' being joined by the aforesaid end loops 19 traversed by the corresponding anchor member. The positions of the filamentary members 17'' are determined by the stitches 14 of the flexible filament 13, such stitches being shown fragmentarily and diagrammatically in the right half of FIG. 12a, forming an outer knitted matrix 12'' that extends circumferentially around the structure. The positions of the filamentary members 17' will similarly be determined by other stitches not shown in FIG. 12a, forming an inner knitted matrix 12' (FIG. 12) that forms the inner periphery of the complete isotensoid structure. Each filamentary member 17 is substantially geodesic and curves rather uniformly as it spans adjacent anchor members in meridonal fashion.

In FIG. 12a the preferred pattern is shown diagrammatically with the filaments being shown rather loosely as they might appear before completion and inflation of the structure and with the filamentary members 17', 17'' spaced widely rather than as they would be in the finished structure, all for purpose of better illustration. In the illustrated pattern, adjacent filamentary members are paired. Thus a pair of filamentary members 17' loop inwardly, usually semicircularly, between the adjacent anchor members while the next pair, constituting filamentary members 17'', loop outwardly between such adjacent anchor members. Such inward and outward looping can be accomplished during the knitting of the outer and inner knitted matrices. Preferably however the outer and inner matrices can be formed by a double-knitting process in which these matrices are knitted more nearly face to face and extend between the anchor members 30 and 30' with the filamentary members 16 more nearly straight and the auxiliary anchor members 46 and 47 absent. The auxiliary anchor members can later be applied and the filamentary members between the anchor members may then later be bowed more severely into the general shape shown. The filamentary members of alternate pairs may pass on the same or opposite sides of a corresponding auxiliary anchor member 46, 47 and the passing portions are desirably laced to such anchor member by a lacing filament 50 that extends generally circumferentially while looping around the auxiliary anchor member and the filamentary members. In one practice of the invention each auxiliary anchor member 46, 47 is placed in position outside the double-knitted matrix and the lacing filament 50 looped around the anchor member and the pairs of filamentary members 17' and 17'' to bind all the filamentary members to the corresponding auxiliary anchor member (FIG. 12a). Another lacing pattern is shown in FIG. 12b in which two lacing filaments 51 and 52 can be used alone to bind the inner and outer matrices together. One of the lacing filaments can then be considered as the auxiliary anchor member. Alternatively an auxiliary anchor member, suggested by the dotted lines 47 of FIG. 12b, can be employed in this lacing pattern with the lacing filaments 50 and 51 extending therearound and, if desired, linked with each other in the spaces between the filamentary members 17', 17' and 17", 17".

Multiple-toroid structures like FIG. 12 and some of the other isotensoid structures of the invention previously described have the very desirable property of being collapsible or expandable. In FIG. 12 this may be in a direction parallel to the central axis of the torus-like structure. During folding or compaction the cross-sectional shape of each torus-like section will flatten. During expansion in an axial direction such cross-section will elongate in this direction. If the filamentary shroud is encapsulated in a compliant material closing the interstices thereof or if the torus-like sections are made impervious by coatings inside and/or outside thereof, the structure of FIG. 12 becomes a pressure vessel. Such a structure can also serve as a pneumatic shock absorber, exerting a resilient force or reaction force in the direction of its central axis. In this respect it can act as a pneumatic spring and, with appropriate valving of passages spring rates can be adjusted by admitting air into or discharging air from each torus-like section. This is particularly true if the filamentary shroud is a part of an encapsulating element molded in the general form shown and thus tending to return to such form when the structure is deformed.

Figure 14:
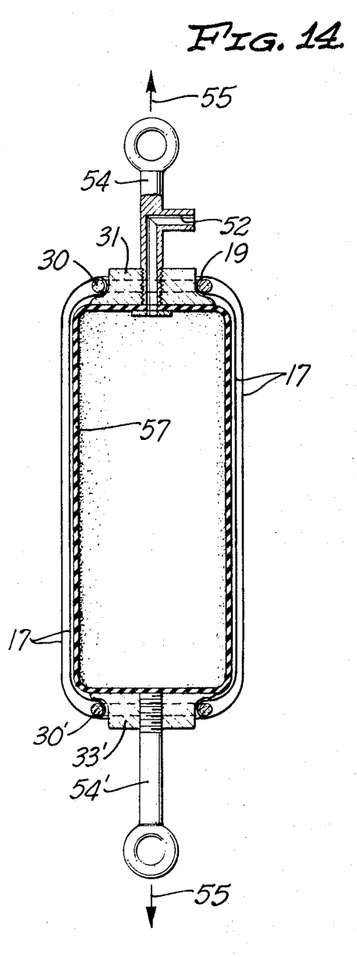
FIG. 14 shows the invention incorporated in an "artificial muscle," shown here in its normal elongated form.
Figure 15:
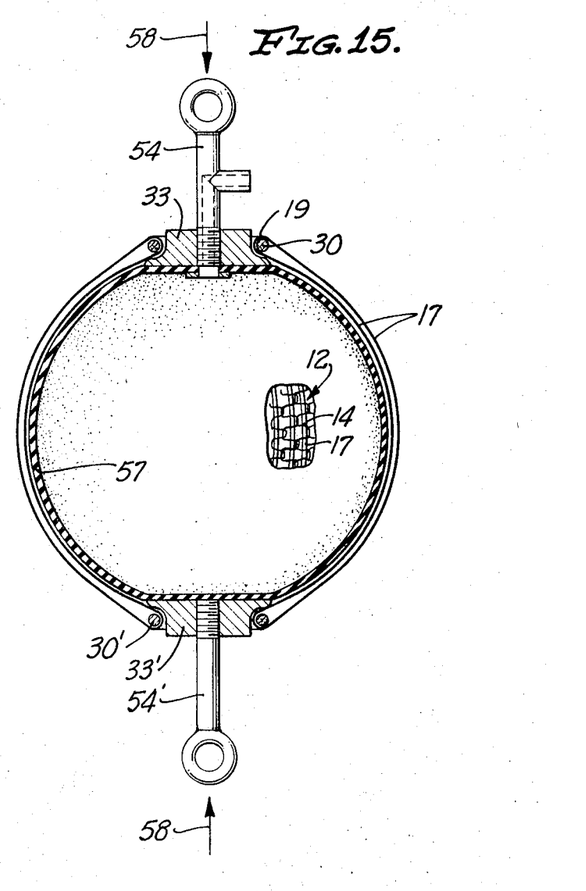
FIG. 15 shows the artificial muscle in inflated form.

FIGS. 14 and 15 show the invention as applied to an artificial muscle. Here the upper and lower anchor members 30 and 30' are rings encircled by the end loops 19 connecting filamentary members 17, these members and the end loops being shown as single lines to illustrate the pattern more clearly. For a similar purpose such members are also shown in different planes at the periphery rather than in a single peripheral plane where they will normally lie in side-by-side relation. The filamentary members extend along rows of stitches 14 of a knitted matrix 12 as previously described and as suggested by the fragmentary surface showing of FIG. 15. The polar openings are closed by flanged elements 33 and 33' in the manner of FIG. 11 with these elements being connected to ring-equipped pull elements 54 and 54' that are movable toward and away from each other in the direction of the arrows 55. The pull element 54 provides a fluid-flow passage 56 opening on the interior of the structure which may be bounded by any suitable coating or covering for the shroud or that may encapsulate it. A bladder-like element 57 is suggested in FIGS. 14 and 15 made of rubber or elastic plastic and having a normal elongated shape as suggested in FIG. 14. When fluid pressure is applied through the passage 56 the structure tends to bulge and become spherical (FIG. 15) resulting in pulling the elements 54 and 54' toward each other as suggested by the arrows 58 of FIG. 15. The structure thus can act as a transducer to convert fluid pressure into a lineal force applied to anything to which the pull elements 54 and 54' are connected through the rings thereof. Conversely if the structure is formed to have a normal bulbous or spherical shape, any pull on the elements 54 and 54' in the direction of the arrows 55 of FIG. 14 will decrease the internal volume and expel fluid from the structure through passage 56, acting as a transducer to convert mechanical movement into fluid pressure.

An important application of the invention is in the manufacture of structures like pneumatic tires, see FIGS. 16–21. Here the filamentary members 17 are substantially meridonal, making the invention ideally suited for the manufacture of so-called radial-cord pneumatic tires.

Figures 16, 17, 18, 19:
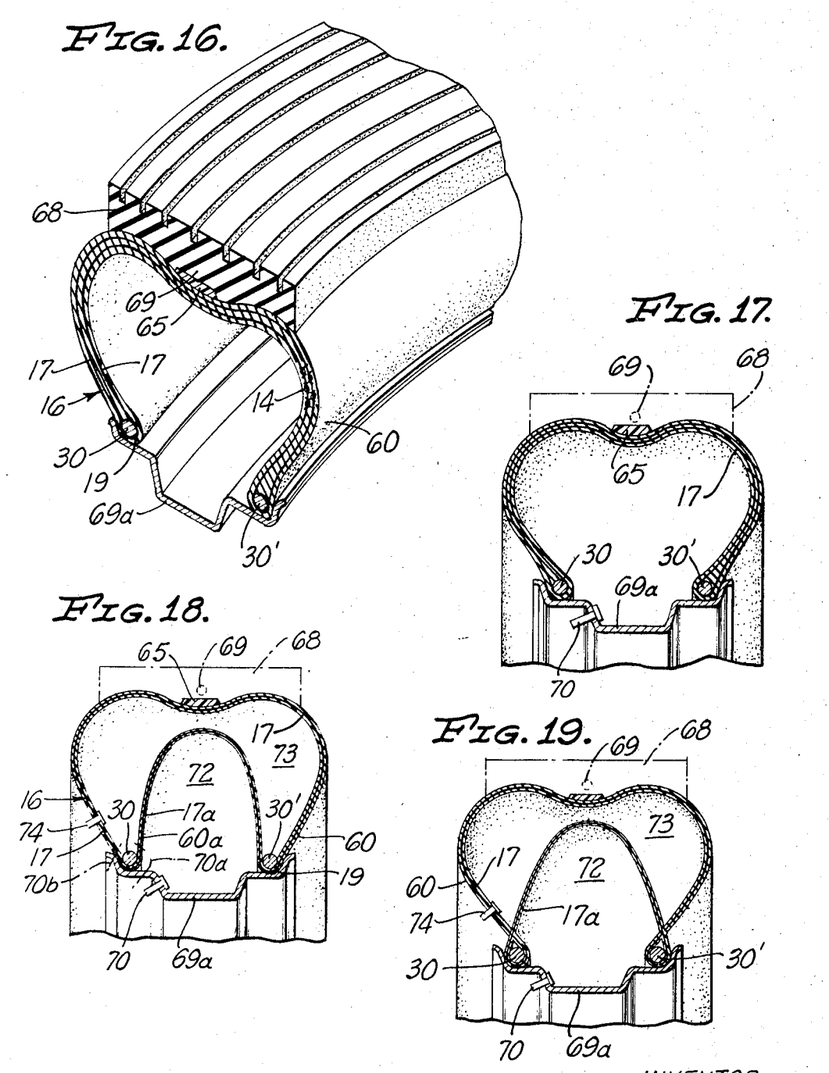

Referring particularly to FIG. 16 a long filamentary element 16 may be looped sinuously between anchor members 30 and 30', here constituting circular tire beads. The element 16 is composed of filamentary members 17 (shown as single lines in FIGS. 16 and 17 out of the common peripheral plane in which they will normally lie) joined by end loops 19 linked by the anchor members or beads 30, 30'. The filamentary members 17 and the anchor members or beads 30, 30' form in effect the tire carcass and are encapsulated in a body 60 of compliant material, such as rubber, employing conventional tire-making techniques. Adjacent filamentary members 17 may be spaced from each other radially or circumferentially of the tire. The latter is preferred as the entire outer crest or circumference of the carcass can then be composed of slightly spaced filamentary members lying side by side in the circumferential plane and extending substantially meridonally between the anchor members or beads 30, 30'.

The filamentary members are desirably initially positioned by being suitably linked with stitches 14 in a manner previously described. Stated in other words, the filamentary members 17 are preferably positioned initially by the aforesaid knitted matrix with these filamentary members being formed by sections of a long filamentary element 16 serpentining between the anchor members or beads 30, 30' albeit in arched relation. The knitted matrix may be shaped during knitting by providing additional shorter rows near the medial plane between those longer rows that extend between the beads but this is usually not essential. Once the filamentary members are embedded in the rubber or other compliant material forming the body 60 of the tire their relative positions will be determined by the compliant material.

The filamentary members 17 may loop or arch between the anchor members or beads 30 and 30' in a rather circular pattern, as in an ordinary pneumatic tire, the outer half of the cross section being substantially a section of a toroid. I prefer however to deform inwardly the outer periphery of the carcass by encircling it with a peripheral stabilizing band 65. This band may be formed of any high-strength material, preferably a material that will return to its initial shape by internal stresses aided by the aid pressure within the tire should the band be locally deformed, as when the tire rolls over a rock. The band 65 may be a spring steel band, cable or wire but is preferably made of a high-strength plastic such as certain types of polyesters, nylons, etc. formed in stranded or monolythic form. Such a band functions to flatten or laterally extend the outer portion of the tire carcass. It serves also to stabilize the tread material as will be described.

The tire carcass of FIGS. 16 and 17 can be treaded in conventional fashion but is desirably used with a replaceable tread formed by a tread member 68. This tread member desirably incorporates a tread hoop 69 embedded in the tread material at a position around and spaced slightly from the peripheral stabilizing band 65. The tread hoop can be made of any of the materials specified for the band 65. The tread member 68 may be molded as a part of the tire body 60 but is preferably molded separate therefrom and later adhered or vulcanized to the body 60. A pressure-sensitive adhesive is often desirable if provision is to be made for replacement of the tread member. Internal pressure within the tire presses the carcass outward against the conforming inner surface of the tread member 68. When the tread member 68 becomes worn it can be replaced by a new one without discarding the carcass. Indeed tread replacement becomes a simple matter with this form of the invention.

The resulting tire can be mounted on a conventional rim 69a that may be a part of or detachably connected to a wheel. Inflation may be in any conventional manner, usually through a valved rim-penetrating valve stem 70 shown diagrammatically in FIG. 17. When the tire is inflated, the tread member 68 is held against lateral displacement by several effects. First, the transversely undulating contour of the outermost portion of the carcass conforms to the molded shape of the inner surface of the tread member 68. Second, the tread hoop 69 holds the inner crest of the tread member 68 in the circumferential pocket of the carcass formed by the presence of the stabilizing band 65. Third, the stabilizing band 65 acts as a foundation, as it were, for the tread hoop 69 and itself stabilizes the tread member 68 by conforming engagement therewith. In addition to the above the adhesion between the carcass and the tread member 68 will tend to prevent lateral or circumferential shifting of the latter.

FIGS. 18 and 19 illustrate alternatives involving a different winding pattern for the filamentary element 16, again shown in single lines. Either embodiment can be employed in making a tire carcass useful in conjunction with ordinary treads or with the replaceable tread member 68. The latter alternative is illustrated.

In FIG. 18 succeeding filamentary members 17 and 17a extend in different paths, as contrasted to extending in the same general path in the embodiment of FIG. 16. Those filamentary members in the outer path lie in the same generally-heart-shaped pattern as in FIG. 16 and are longer than the filamentary members 17a which loop in an inner path. The filamentary members 17 in the outer path may be encapsulated in an outer body member 60 as previously described. The filamentary members 17a in the inner path may be encapsulated in an inner body member 60a that is desirably quite thin and flexible. Both the outer filamentary members 17 and the inner filamentary members 17a are preferably spaced by a knitted matrix of the type previously described although other means for spacing the filamentary members from each other prior to encapsulation can be employed. The inner filamentary members 17a loop between the anchor members or beads 30, 30' in arched configuration with the crest of the arch preferably spaced inwardly from the inwardly-presented crest of the outer carcass in which the filamentary members 17 are encapsulated. The structure can be considered as having an inner bladder-like element within the outer carcass but independent thereof except for integration near the anchor members or beads 30, 30' by the compliant encapsulating material and except for integration of the filamentary members 17 and 17a by the end loops 19. In this latter respect it will be clear that the long filamentary element 16 is looped around the anchor members or beads 30, 30' and extends to and fro therebetween, first in the longer loop of the outer carcass and next in the shorter loop of the inner bladder-like element. As before, the filamentary members 17 and 17a are sections of the filamentary element 16 and are integrated by the end loop sections thereof.

The inner bladder-like elemnt forms an air chamber 72 that is within an outer air chamber 73 between the inner and outer elements. The air pressure in the inner chamber 72 should desirably be maintained higher than in the outer chamber 73 to keep the filamentary members 17a under tension. The higher pressure in the inner chamber 72 as compared with that in the outer chamber 73 also improves riding quality, reduces side sway without causing a "hard" ride, acts as a safety measure in stopping the vehicle if the outer body 60 should fail or blow out, supplements the supporting action of the tire if the outer body 60 should locally deflect inward to engage the crest of the inner body member 60a, and has other advantages. Inflation of the inner chamber 72 may be through a valved rim-pentrating valve stem 70 as previously described. Inflation of the outer chamber 73 may be through a similar rim-penetrating valve stem extending in the direction of the dotted line 70a or the dotted line 70b but is shown as a side-wall-penetrating valve stem 74 that is suitably valved.

The embodiments of FIGS. 18 and 19 differ from each other primarily in the winding pattern of the filamentary element 16. In FIG. 18 the filamentary members 17 and 17a approach the anchor member in spaced relation. In FIG. 19 they cross each other in this approach. The embodiment of FIG. 19 provides a slightly larger inner air chamber 72. Except for these differences the embodiment of FIG. 19 can follow the structure described with reference to FIG. 18.

Figure 20:
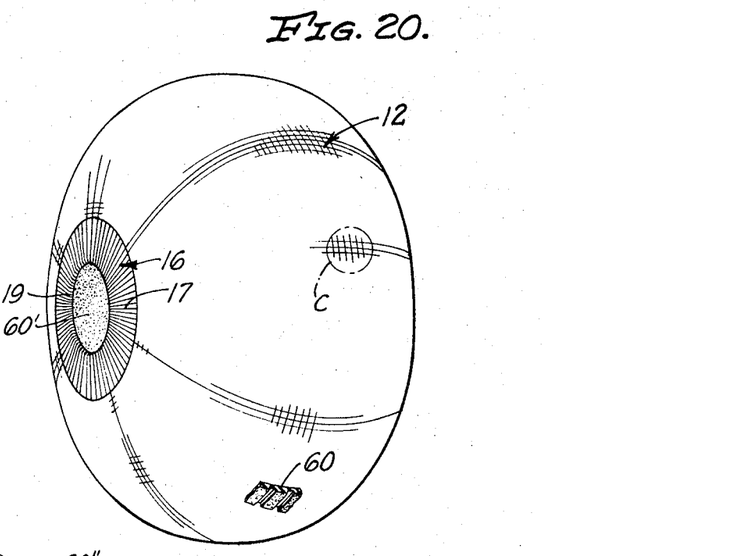
FIG. 20 illustrates the invention incorporated in the carcass of a large-footprint pneumatic tire, FIG. 20a being an enlarged showing of a typical pattern within the dotted circle C of FIG. 20.
Figure 20A:
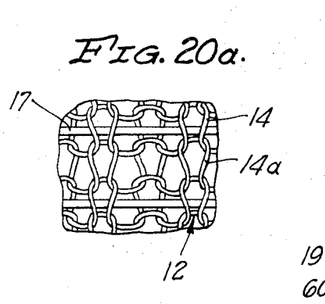
Figure 21:
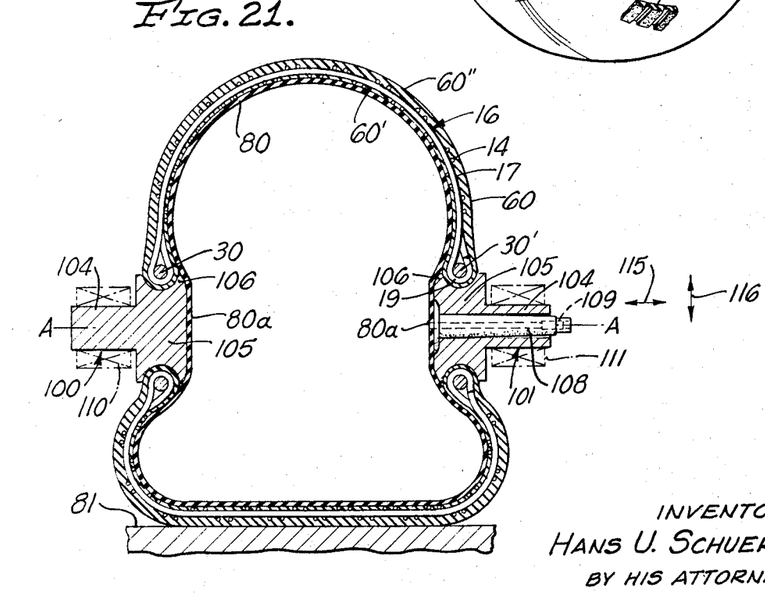
FIG. 21 illustrates another form of large-footprint tire that can be made to form an axle-less wheel.

FIG. 20 shows a large-footprint tire carcass embodying the invention while FIG. 21 shows a similar carcass and one way of mounting it. The filamentary members 17 are again sections of a long filamentary element 16 being joined by end loops 19 through which anchor members or beads 30 and 30' pass. As before, it is preferred that the positions of the filamentary members 17 should be determined by linkage with stitches 14 of a knitted matrix 12, as suggested in the fragmentary view of FIG. 20a. To shape the knitted matrix in the desired tire contour the stitches may comprise complete rows extending between the anchor members with intervening shorter rows or sub-rows in zones closer to the medial plane. The stitches 14a of FIG. 20a may be stitches of such a shorter row.

These embodiments differ from some of those earlier described in their extreme bulbous form. The medial diameter of the unloaded tire or carcass is several times the diameter of the anchor member or beads 30, 30' whether the latter are of the same diameter, as shown, or of diffeernt diameters as may sometimes be desirable. Ratios of medial diameter to anchor-member diameter may be in the range of about 3:1 to 10:1. The loop length of each filamentary member 17 between the two anchor members or beads can approach or exceed the unloaded medial diameter of the tire or carcass. Each filamentary member may be linked with or intertwined with the knitted matrix throughout substantially its entire length. Stated otherwise the knitted matrix will desirably extend over the crown of the carcass and nearly to the anchor members or beads 30, 30'. At each anchor member or bead 30, 30' the end loops 19 can be tightly compacted in side-by-side relation but will preferably not overlie each other.

Such a tire carcass can be made impervious by layers of rubber interior and/or exterior thereof suitably adhered thereto or may be encapsulated in a body 60 of rubber or other compliant material. FIG. 20 shows a small fragment of the exterior portion of such a body 60, formed with a rib tread. FIG. 21 shows a similar encapsulating body 60 presenting an inner tire surface 60' and an outer tire surface 60'' which can be smooth or treaded. The tire may be tubeless or may contain a tube such as the bladder-like tube 80 of FIG. 21 or a tube of toroidal shape if the tire is to be conventionally mounted.

The tire, including its carcass and the body 60 is desirably quite flexible and the inflation pressure is relatively low so that when the tire is normally or heavily loaded (FIG. 21) it will present a large footprint to the ground 81 or other supporting surface. The width of such a footprint can be made equal to or greater than the axial spacing of the anchor members or rings 30, 30'. Tires of this nature are particularly desirable in automotive use as they increase the area of contact with the road. They are also particularly desirable in association with landing gear of aircraft because of this property and because of their cushioning action when the plane is being landed. By appropriate design of the mounting means these tires offer the additional advantage of being collapsible into a minimum space in the aircraft when not in use, see infra.

FIG. 21 shows a mounting and closing arrangement particularly suitable to such a tire. In effect FIG. 21 discloses an axle-less wheel that can be supported as a cantilever from a single mounting member 100 that is suitably journalled. As illustrated however the axle-less wheel is associated with two members 100 and 101 both journalled either in fixed bearings or in bearings that can be moved toward and away from each other along the rotative axis A—A to permit partial or substantially complete lateral collapse of the tire on deflation and lateral expansion to normal size upon inflation. Each mounting or closure member may include a bearing portion 104, a hub portion 105 having a groove fitting the corresponding polar openings of the tire, and a flange 106 locking the member to the tire against lateral displacement. The hub portion 105 may provide a similar flange outside the tire, removable if desired, but a sufficient flange is usually provided by the outer shoulder of the groove shown. In FIG. 21 the tube 80 is an oblate spheroid bladder having central portions 80a overlying the flanges 106. Inflation may be through a valve stem 108 extending through an axial passage of the mounting member 101. The stem 108 may include any conventional valve 109.

Bearings for the embodiment of FIG. 21 may take any one of a number of forms and are therefore shown only diagrammatically by dotted lines. Thus, a fixed or movable bearing 110 may journal the mounting member 100 and a similar bearing 111 may journal the member 101. These bearings may be mounted to move toward and away from each other in the direction of the arrow 115. Both bearings may be mounted to move together in the direction of the arrow 116. By way of example, such a tire can be partially or completely deflated and the bearings moved toward each other in the direction of the arrow 115 before or during the time that both bearings are moved together in the direction of the arrow 116 to retract the collapsed tire into a stowage compartment of an aircraft. The bearings may be a part of a conventional landing gear which, when extending, may also provide for movement of the bearings in the direction of the arrow 116 as opposed by conventional shock absorbers. Additionally or in the same connection it is possible to mount one of the bearings to move in the direction of the arrow 116 independently of the other bearing, thus laterally displacing the axes of these bearings or even disposing these axes at an angle to each other. The axle-less nature of the embodiment of FIG. 21 provides the possibilty of this type of motion, permitted by the flexible nature of the tire which interconnects the mounting members journalled by the bearings.

Various changes and modifications can be made without departing from the spirit of the invention as defined in the appended claims.

I claim:

1. A thin-walled high-strength isotensoid structure having precise dimensional tolerances in one direction within the wall, representing the direction of stress due to applied loading, while remaining extensible and flexible in another direction, which other direction is within the wall and normal to the direction of stress due to applied loading, said isotensoid structure having a high-strength shroud comprising:
   a knitted matrix made of at least one continuous flexible filament formed into progressive rows of knitted stitches with the stitches of each row being interlocked with those of adjacent rows and with the stitches of each given row traversing a space between the rows respectively preceding and succeeding such row;
   a plurality of substantially-geodesic joined-together load-carrying high-strength filamentary members extending through said spaces in the direction of said rows and linked with the stitches traversing same, said stitches holding said filamentary members in side-by-side pattern against separation of the filamentary members in said other direction greater than permitted by the knitted stitches when taut in such other direction, each filamentary member being of much higher strength in tension than said flexible filament, said filamentary members being joined together on at least one edge of said knitted matrix by loop means providing loops that loop outward from said edge to positions therebeyond; and
   an anchor member extending through said loops, said anchor member being of a strength at least as great as that of each of said filamentary members.

2. An isotensoid structure as defined in claim 1 in which each stitch of each row comprises a loop of said flexible filament extending across a corresponding space, and in which the loops traverse the load-carrying filamentary member in such space alternately in front of and behind such load-carrying filament to effect said linkage.

3. An isotensoid structure as defined in claim 1 in which each stitch of each row comprises a loop of said flexible filament extending across a corresponding space, and in which the load-carrying filamentary member in such space extends through at least some of said loops of the corresponding row to effect said linkage.

4. A high-strength isotensoid structure as defined in claim 1 in which those rows of the knitted matrix having stitches linked with filamentary members are spaced by other rows of said stitches throughout at least a portion of the row length, said other rows of stitches being free of said filamentary members.

5. A high-strength isotensoid structure as defined in claim 1 including a run-stop element linked with the stitches of some of said rows, said run-stop element serpentining across said knitted matrix in the direction of said rows.

6. A high-strength isotensoid structure as defined in claim 1 in which said filamentary members are of progressively different length in progressive rows of stitches.

7. A high-strength isotensoid structure as defined in claim 1 in which at least some of said filamentary members are paired filamentary members joined by an end loop, and in which both filamentary members of a pair are linked with stitches of the same row.

8. A high-strength isotensoid structure having a high-strength shroud comprising:
   a knitted matrix made of at least one continuous flexible filament formed into rows of knitted stitches with the stitches of each row being interlocked with those of preceding and succeeding rows, said knitted matrix having opposed end portions at the ends of said rows; and
   a long high-strength filamentary element linked with the stitches of a plurality of rows and serpentining across said knitted matrix from end portion to end portion thereof, said filamentary element comprising body sections forming filamentary members extending in the direction of said rows linked with at least some of the stitches thereof and end sections forming end loops extending from at least one of said opposed end portions, said end sections integrally joining said body sections.

9. An isotensoid structure as defined in claim 8 in which each of said body sections is of precise length, and including an anchor member linked with each end loop extending from the corresponding end portion of said knitted matrix.

10. An isotensoid structure as defined in claim 9 in which said knitted matrix is curved and forms a peripherally closed knitted matrix with said end loops lying in a closed geometric pattern, and in which said anchor member is a ring of said geometric pattern.

11. An isotensoid structure as defined in claim 10 including a member having a flange of said geometric pattern, said anchor member extending around said flange with portions of said end loops clamped between said anchor member and said flange, thereby anchoring said shroud to said flange.

12. A high-strength isotensoid structure having a high-strength shroud comprising:
   two ring-shaped anchor members in planes spaced from each other;
   a peripherally closed knitted matrix in the space between said anchor members made of at least one flexible filament formed into progressive rows of knitted stitches with the stitches of each row interlocked with those of preceding and succeeding rows, said knitted matrix having opposed end portions at the ends of said rows with each end portion lying near a corresponding anchor member; and a long high-strength filamentary element extending to and fro across said space around and between said anchor members, said filamenatry element comprising body sections forming a series of filamentary members traversing said space in the direction of said rows and linked with at least some of the stitches of a corresponding row, said filamentary element comprising also end sections integrally joining said body sections and forming end loops protruding from each of the opposed end portions of said knitted matrix to form two series of end loops, each anchor member being linked with the end loops of a corresponding series.

13. A high-strength isotensoid structure as defined in claim 12 in which said knitted matrix includes an inner portion bowing inwardly in said space between said anchor members with stitches of such inner portion linked with certain of said filamentary members and an outer portion bowing outwardly in said space with stitches of said outer portion linked with other of said filamentary members.

14. A high-strength isotensoid structure as defined in claim 13 including means for joining said inner and outer portions in said space in a plane between the planes of said two ring-shaped anchor members, said inner and outer portions of said knitted matrix on one side of said plane forming an upper toroid and said inner and outer portions of said knitted matrix on the other side of said plane forming a second toroid.

15. A high-strength isotensoid structure as defined in claim 13 including at least one auxiliary anchor member in a plane intermediate the planes of said two anchor members, and a lacing filament lacing together said auxiliary anchor member and portions of said filamentary members traversing same.

16. A high-strength isotensoid structure as defined in claim 12 in which all of said filamentary members arch in the same direction in said space between said anchor members.

17. A high-strength isotensoid structure as defined in claim 16 in which said knitted matrix and said filamentary members comprise a foraminous shroud, and including a body of a compliant material conforming in shape to said shroud making such shroud impervious, and means within the openings of said rings closing the interior of said shroud and forming therewith a pressure vessel.

18. An isotensoid structure as defined in claim 17 in which said means within the openings of said rings comprises two flanged elements respectively extending at least partially across such openings with the flange of each closure member being surrounded by a corresponding anchor member and with the corresponding end loops extending between such flange and such anchor member.

19. A high-strength isotensoid structure as defined in claim 18 in which said flanged elements are closure members and in which said shroud with its body of compliant material is deformable upon change in the pressure inside said vessel relative to the pressure outside thereof from a first elongated form in which said closure members are widely spaced to a more bulbous form in which said closure members are spaced a lesser distance, pull members respectively attached to said closure members, and means for relatively changing the pressures inside and outside of said vessel to change the spacing of said closure members.

20. An isotensoid structure as defined in claim 17 in which said means within the openings of said rings comprises a single circular element having flanged portions at opposite ends thereof forming with said shroud and its compliant material a toroidal space around said single circular member within said shroud, said anchor members respectively encircling said flange portions.

21. A pneumatic tire including an isotensoid carcass comprising:

two ring-shaped tire beads in planes spaced from each other;

a long filamentary element wound around and serpentined between said spaced tire beads with longer sections of said filamentary element forming filamentary members arching outwardly across the space between said beads in side-by-side relation and with shorter sections of said filamentary element forming end loops around said beads; and a filamentary matrix arching outwardly across said space having filaments traversing each filamentary member with such filamentary member entwined therewith.

22. A pneumatic tire as defined in claim 21 in which said filamentary matrix is a knitted matrix having stitches in rows parallel to said filamentary members with each filamentary member linked with stitches in a row thereof.

23. A pneumatic tire as defined in claim 21 in which said filamentary members extend meridonally and in side-by-side spacial relation determined by said filamentary matrix, said end loops being closely compacted in side-by-side relation adjacent said beads.

24. A pneumatic tire as defined in claim 23 in which alternate filamentary members comprise outer filamentary members extending across said space in an outer arched path, the intervening filamentary members comprising inner filamentary members extending across said space in an inner path, and including outer and inner filamentary matrices in correspondingly arched paths with the outer filamentary members entwined with filaments of said outer matrix and with the inner filamentary members entwined with filaments of said inner matrix.

25. A pneumatic tire as defined in claim 24 including an outer body of compliant material encapsulating the outer matrix and the outer filamentary members entwined therewith, and an inner body of compliant material encapsulating the inner matrix and the inner filamentary members entwined therewith.

26. A pneumatic tire as defined in claim 25 in which said outer body and said inner body form outer and inner air chambers within the tire, and including means for separately pressuring said air chambers to maintain in said inner chamber a pressure greater than in said outer chamber.

27. A pneumatic tire as defined in claim 21 in which said filamentary members and said filamentary matrix comprise a shroud, and including a body made of compliant material encapsulating said shroud, said end loops and said beads.

28. A pneumatic tire as defined in claim 27 including a ring-shaped band of a diameter less than the nominal crest diameter of said shroud in the medial plane of the tire, said nominal crest diameter being the medial diameter with said filamentary members arching between said beads as circular sections, providing a shroud crest dishing inward at said medial plane.

29. A pneumatic tire as defined in claim 28 including a tread member surrounding said inwardly dished crest, said tread member conforming in shape inwardly to the shape of said inwardly dished crest.

30. A pneumatic tire as defined in claim 28 in which said tread member is a replaceable tread member separate from said shroud, and including a hoop of high strength material embedded in said tread member at a position overlying said ring-shaped band.

31. A pneumatic tire as defined in claim 27 in which the outer medial diameter of said shroud bears a ratio to the bead diameter in the range of about 3:1 to 10:1.

32. A pneumatic tire as defined in claim 31 in which the interior of said shroud is in the shape of an oblate spheroid.

33. A pneumatic tire as defined in claim 32 in which said rings form polar openings, and including separate and independently movable flanged closure members respectively closing said polar openings with the flange of each closure member encircled by a corresponding tire bead with end loops therebetween.

34. A pneumatic tire as defined in claim 33 in which at least one of said closure members is a journalled member, said closure members being independently movable relative to each other in the direction of the axis of rotation of the tire.

35. A pneumatic tire as defined in claim 33 in which at least one of said closure members is a journalled member, said closure members being independently movable relative to each other laterally of the axis of rotation of the tire.

36. A high-strength isotensoid structure as defined in claim 1 including a layer of compliant material conforming in shape to said shroud with the layer of compliant material attached thereto making such shroud impervious.

37. A high-strength isotensoid structure as defined in claim 12 including a layer of compliant material conforming in shape to said shroud with the layer of compliant material attached thereto making such shroud impervious.

References Cited

UNITED STATES PATENTS

| | | | |
|---|---|---|---|
| 500,658 | 7/1893 | Huss | 152—355 |
| 591,456 | 10/1897 | Cowen | 152—358 |
| 630,783 | 8/1899 | Stevens | 66—190 |
| 644,731 | 3/1900 | Cousins | 152—181 XR |
| 649,720 | 5/1900 | Duryea | 152—358 |
| 797,138 | 8/1905 | Marshall | 152—358 |
| 1,383,190 | 6/1921 | Demas | 152—358 XR |
| 1,555,032 | 9/1925 | Siegel | 66—190 |
| 2,090,554 | 8/1937 | Rubinstein | 66—125 |
| 2,458,801 | 1/1949 | Schwartz | 66—190 XR |
| 2,653,463 | 9/1953 | Crimmins | 66—190 |

MERVIN STEIN, *Primary Examiner.*

RONALD FELDBAUM, *Assistant Examiner.*

U.S. Cl. X.R.

66—202